Figure 1:
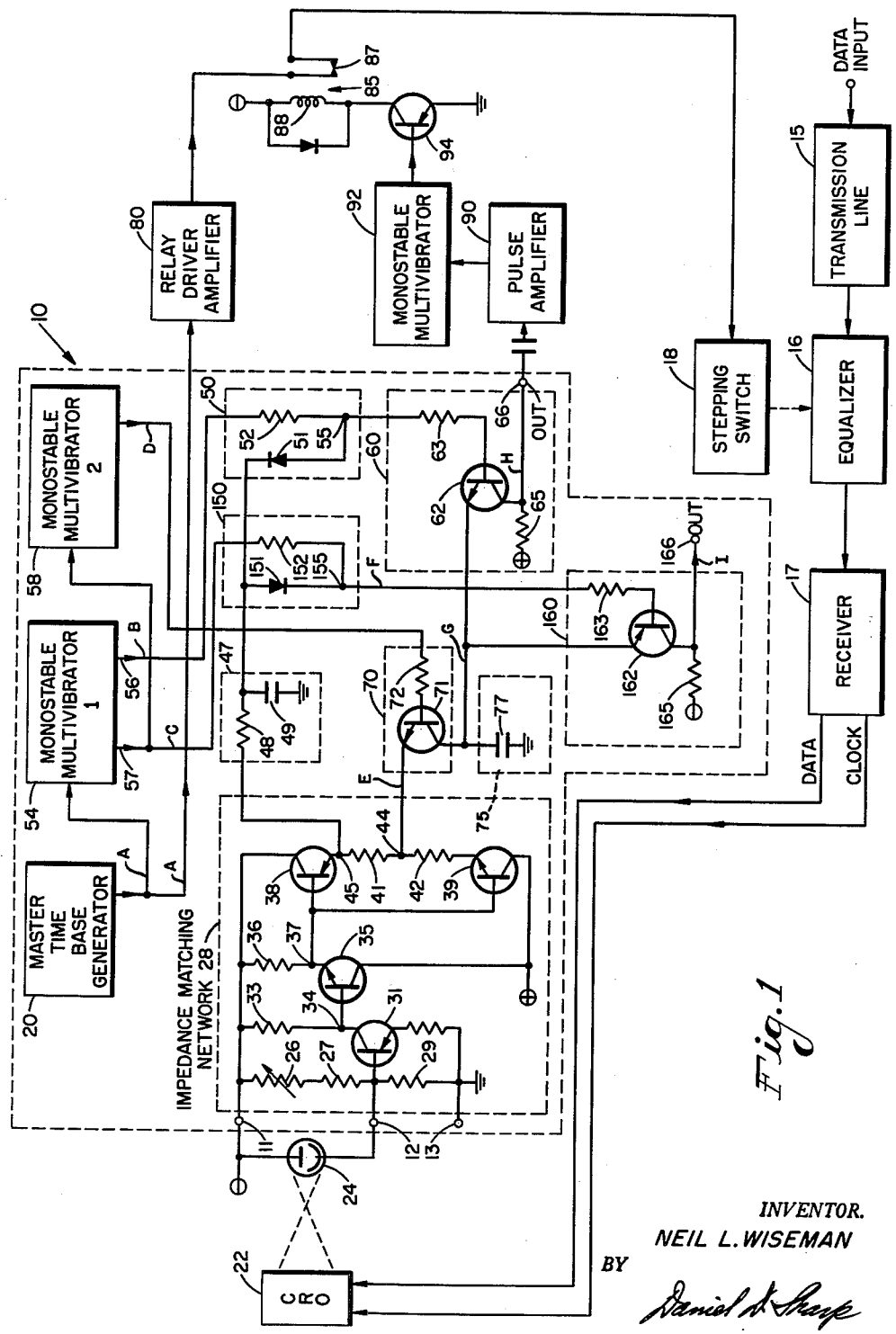

July 27, 1965    N. L. WISEMAN    3,197,655
VOLTAGE STEP DETECTOR
Filed Feb. 6, 1962    2 Sheets-Sheet 2

United States Patent Office 3,197,655
Patented July 27, 1965

3,197,655
VOLTAGE STEP DETECTOR
Neil Leman Wiseman, Rochester, N.Y., assignor to General Dynamics Corporation, Rochester, N.Y., a corporation of Delaware
Filed Feb. 6, 1962, Ser. No. 171,505
9 Claims. (Cl. 307—88.5)

This invention relates to a detector and, more particularly, to a device capable of determining either a change in level of a stepwise varying signal or a change in direction of variation of such a signal.

An object of this invention is to provide means for detecting the presence of a change in direction of variation of an analog input voltage subject to stepwise variations.

Another object of this invention is to provide means for detecting the direction of variation of a voltage which varies in stepwise fashion.

A further object of this invention is to provide means for detecting an input voltage change at an instant other than the instant that change occurs, thereby avoiding the effect of transients accompanying such changes upon the indication furnished by the detector.

Other objects of this invention will become apparent hereinafter and will be more particularly pointed out in the appended claims.

The detector is supplied with an input voltage which normally changes in magnitude in stepwise fashion, which changes may or may not occur at regular intervals. This stepwise variation may be in either a positive or a negative direction. The detector may be used as a slope detector to detect the fact that a change in direction of variation of the input voltage has occurred, or it may be used to detect a change in the magnitude of an input voltage. The detector includes a sample gate circuit to which is applied, during the sampling period, a sampled voltage, that is, a voltage either equal to or proportional to some level of step input voltage, as well as a stored voltage derived during a previous level of the stepped input voltage. The sample gate can be arranged either to provide a distinctive output during the sampling period only when the input voltage has increased, or to provide a distinctive output only when the input voltage has decreased. By using two sample gates arranged as just described, an indication of a change in input voltage level in either the positive or negative direction may be obtained.

The sequence of operation of the slope detector is, first, the sampling of a given voltage level; second, storage of that given level after the sampling period has ended; and, third, stepping, if any, of the voltage to a new voltage level. The sampling periods must not be coextensive with the storage period; otherwise, one would always store the same level as the level being sampled instead of storing the level of voltage existing prior to the level currently being sampled. The stored voltage, of course, must remain substantially unchanged until the next sampling period to provide a true comparison of the present and previous voltage levels.

In accordance with one embodiment of the invention, the output from the detector is used to prevent continued stepping of the step voltage by a stepping mechanism which normally steps each time a clock pulse is received. In this event, adjacent sampling and storage intervals occurred during the period occupied by each clock pulse. In other words, the sequence of operation is, first, to sample a given stepped voltage during a corresponding clock pulse; second, to store that voltage during the period of the same clock pulse; and, third, to step the voltage to a new value, provided that no output is obtained from the detector (provided the direction of stepping of the step input voltage to the detector does not change).

If the direction of stepping does change, the detector output pulse prevents further stepping in that direction and the stepping mechanism is deenergized until subsequently energized again, either manually or otherwise.

The invention will now be described in detail in connection with the accompanying drawings wherein:
FIG. 1 is a diagram showing an embodiment of a detector according to the invention, also illustrating accompanying circuitry with which the detector may be used; and,
FIG. 2 discloses representative waveforms derived at certain portions of the circuitry of FIG. 1.

Figure 2:
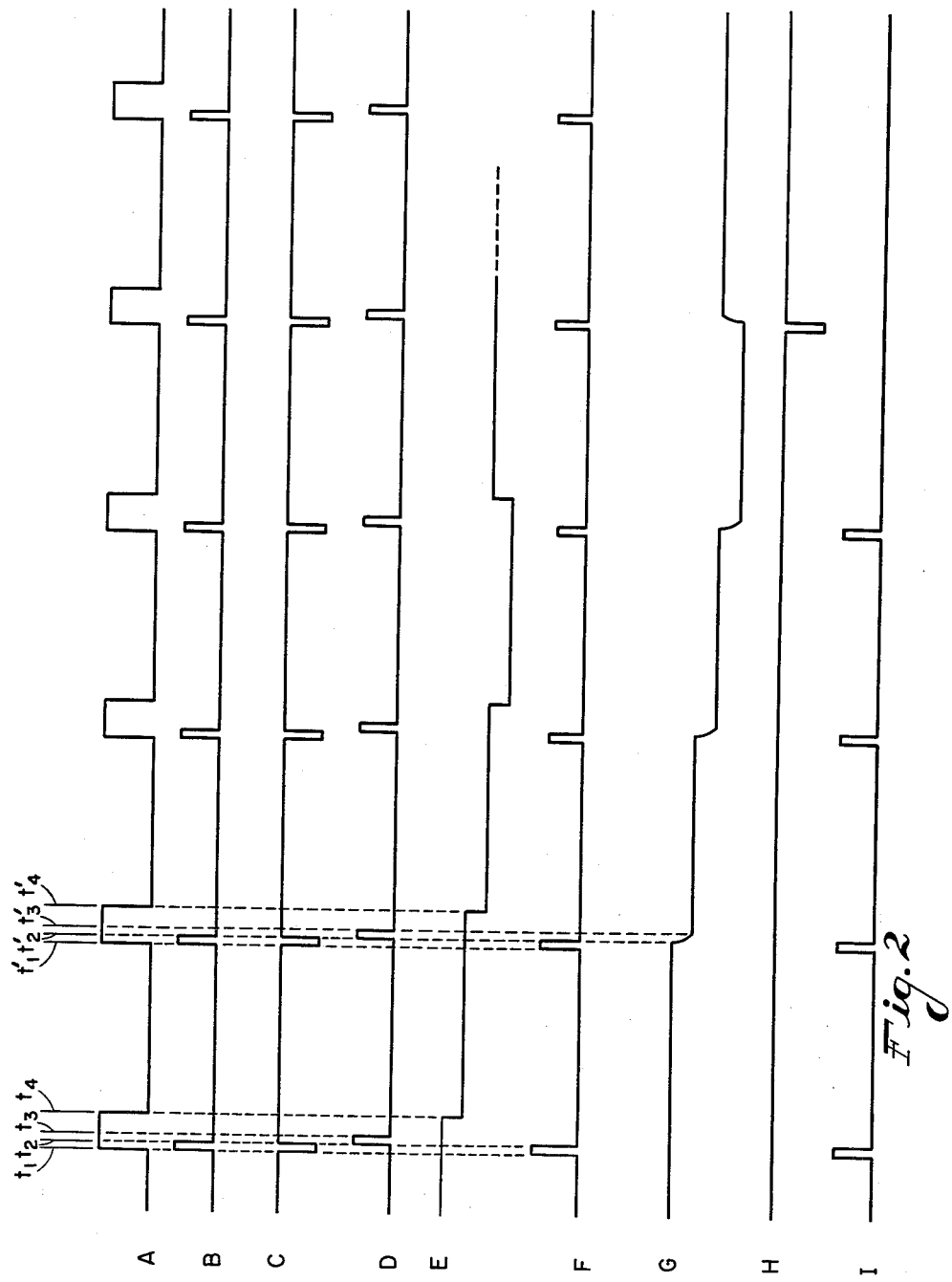

Referring to FIG. 1, a detector 10 is shown having input terminals 11 and 12 receptive of an input voltage which is adapted to change in discrete steps in a manner to be described subsequently. The detector 10 is enclosed with dashed lines and the portion of the system of FIG. 1 with which the detector may be used is shown outside the dashed lines. As shown in FIG. 1, input data and associated timing information may be transmitted through a transmission line facility 15 and an equalizer 16 to a data receiver 17; the function of the equalizer is to correct for phase and amplitude distortion of the data supplied to the transmission line. An electromechanical stepping switch 18 is coupled mechanically to the equalizer 16 and, when initially energized, will continue a step to a new position whenever a clock pulse 2A from master time base generator 20 is supplied thereto. The stepping action, as will be described more fully later, is made to coincide with the trailing edge of the clock pulse (see waveform A—FIG. 2); the trailing edge occurs at a time $t_4$, $t'_4$, etc., as indicated in FIG. 2. Each time that the stepping switch 18 operates, it changes the characteristics of equalizer 16 and, consequently, the form of the data emerging from receiver 17; this data from receiver 17 is supplied to cathode-ray oscilloscope 22. The oscilloscope can be synchronized from the clock output of the receiver 17. As described in detail in an application for U.S. Letters Patent of Winfree P. Tuck and Neil L. Wiseman, Serial No. 163,558, filed January 2, 1962, the light intensity of the luminous trace formed on the screen of the oscilloscope 22 and visible through an aperture in a mask placed over the face of the oscilloscope screen will depend upon the output of the equalizer 16. The better the equalization of the transmission line 15 becomes, the less is the intensity of the light emanating from the oscilloscope screen and impinging upon a photocell 24. The resistance of photocell 24 changes inversely with the amount of light falling upon the photocell. In other words, the resistance of photocell 24 will either increase or decrease from some discrete level to another level everytime the stepping switch steps to a new position, and will increase as the equalization successively improves. The resistance presented by photocell 24 is in shunt with the series combination of a variable resistor 26 and fixed resistor 27 and, together with resistor 29, forms a voltage divider network in the input stage of impedance matching network 28. The function of network 28 is to match the relatively high impedance of the photocell 24 to the low impedance represented by storage switch 70. The voltage divider network is connected to the negative terminal of a power supply which includes two terminals, one of which is, for example, at minus 12 volts relative to ground and the other terminal at plus 12 volts relative to ground. If, for example, the resistance of the photocell 24 increases, the combined resistance of the portions 26, 27 and 24 of the voltage divider network increases; the negative voltage at detector input terminal 12, relative to ground terminal 13 and, consequently, the voltage at the base of P-N-P transistor 31 of impedance matching network 28, accordingly decreases; this causes the current in transistor 31 to decrease. It should be noted, at this point, that the variable resistor 26 may be used to adjust the bias on transistor 31 to permit conduction to occur when a preselected light threshold is attained. As the current flow in the common emitter circuit decreases, the voltage available at the base of common collector transistor 35 more nearly approaches the minus 12 volt level of the power supply. Since the voltage at point 34 (base voltage of transistor 35) becomes more negative, current flow in ressitor 36 of transistor 35 decreases and the voltage of point 37 more nearly approaches the negative supply potential. This negative-going voltage at point 37 is applied to the bases of a common emitter complementary amplifier circuit using transistors 38 and 39 of opposite conductivity type. The load resistors 41 and 42 in this circuit are substantially equal in value and are each of relatively small resistance. As the base potential of base transistors 38 and 39 become more negative, the resistance of transistor 38 decreases and the resistance of transistor 39 increases; this causes the output voltage of the complementary stage to become more negative. This output voltage derived at the junction of resistors 41 and 42 is directly proportional to the input voltage appearing across terminals 12 and 13 of the detector 10 but is of opposite polarity. For the particular application shown in FIG. 1 wherein a photocell is used, the terminals 11 and 12 actually constitute the physical input terminals of the detector and the varying resistance of the photocell 24 connected across terminals 11 and 12 causes the voltage between terminal 12 and ground terminal 13 to vary accordingly. The voltage across terminals 12 and 13 is applied to the input circuit of transistor 31 and may be considered to be the input voltage to the detector. In the case of an ordinary input voltage to be analyzed, such voltage would be applied directly across terminals 12 and 13. It should be noted here, however, that the voltage at point 44 may be of the same polarity as the input voltage across terminals 12 and 13 provided the impedance matching amplifier network 28 is designed to avoid polarity reversal. Changes in the remainder of the detector circuit necessary to take care of such a polarity reversal will be explained later in the application.

The voltage at point 45 is approximately equal to that at point 44; specifically, the voltage at point 45 is equal to the voltage at point 44 minus the small voltage drop across resistor 41. The voltage at point 45, which will be referred to as a sampled voltage, may be integrated by an integrating circuit 47 comprising resistor 48 and capacitor 49 in order to smooth out any fluctuations that may occur in the input voltage; such fluctuations may occur, for example, because of minor fluctuations in light intensity of the complex oscilloscope trace representing the data signals which may be undergoing phase and amplitude distortion in the transmission line 15. The integrated sampled voltage is applied to a sample gate 50 consisting of a diode 51 and resistor 52. It should be noted that the integrator 47 does not appreciably attenuate the sampled voltage, since the integrator resistor 48 is much smaller than the resistor 52 of the sample gate. The resistor 52 is large enough to provide sufficient voltage drop thereacross to prevent positive excursions of the output pulse (B—FIG. 2) from multivibrator 54 from producing appreciable voltage drop across diode 51 and resistor 48 during the sampling period, to be described subsequently. The normal voltage drop across the diode 51 of the sample gate 50, which may be of the order of 0.2 volt, is compensated for by the small voltage drop across resistor 41. This explains the reason for applying a voltage at point 45 to the gate 50, rather than the slightly higher voltage at point 44.

The timing for the system is provided by means of the master time base generator 20, a first monostable multivibrator 54 and a second monostable multivibrator 58. The monostable multivibrators may be conventional transistorized multivibrator circuits productive of a narrow pulse whenever triggered by an input pulse. The master time base generator 20 may be a unijunction transistor multivibrator such as described on pages 144 and 145 of the General Electric Transistor Manual, 5th edition, 1960, published by the General Electric Company. The clock pulses from master time base generator 20 are as shown in FIG. 2—waveform A; these clock pulses are coupled to the first monostable multivibrator 54. The leading edge of each clock pulse is responsible for generation on a first output line 56 of monostable multivibrator 54 of a positive-going sampling pulse (waveform B—FIG. 2) which is supplied to the sample gate 50. The sampling pulse which, by way of example, rises to a value of plus 10 volts from a minus 12 volt level, has a duration from time $t_1$ to time $t_2$, as indicated in FIG. 2. The second output of multivibrator 54 on line 57 consists of a negative-going sampling pulse (C—FIG. 2) which may have a peak value of minus 12 volts extending downwardly from a normal level of plus 10 volts; this second output is coupled to monostable multivibrator 58, whereupon an output pulse (D—FIG. 2) is derived, the leading edge of which coincides with the trailing edge of either of the two sampling pulses B and C. This output pulse D is used as the storage pulse. Although the storage pulses have been referred to as being generated by the trailing edge of the sampling pulse, the basic requirement of the invention is that the sampling period be terminated prior to the arrival of the storage period in order to compare two successive voltage levels at the sample gate. Although, theoretically, the leading edge of the storage pulse D is coincident with the trailing edge of the sampling pulses B and C in FIG. 2, the two pulses do not overlap in practice, since there is always some finite delay in operation of the pulse forming means.

Although the sampling pulse has been referred to as generated in coincidence with the leading edge of the corresponding clock pulse, the invention does not necessarily require this condition. It is necessary only that the sampling and storage period fall within the minimum interval between two successive voltage steps.

Usually, the output line 56 of multivibrator 54 is at approximately minus 12 volts; this voltage, appearing at point 55, is sufficient to back bias diode 51 and maintain gate 50 in the open condition. The leading edge of the first clock pulse A occurring after the system is turned on will initiate a first sampling pulse B which occurs during the time interval $t_1$ to $t_2$. During this sampling interval, the sampling pulse 2B is applied to gate 50, whereupon the voltage at point 55 becomes sufficiently positive to permit diode 51 to conduct; in other words, sampling pulse B will open gate 50. The voltage available at point 44 (the sampled voltage) is then available at point 55 and is supplied to sample gate 60. The latter includes an N-P-N transistor 62 biased normally in the nonconductive state by virtue of the base electrode being reverse biased by the negative potential at point 55 through resistor 63. This sample voltage at point 55 is coupled through sample gate resistor 63 to the base of transistor 62 during this sampling interval $t_1$ to $t_2$. After the first sampling pulse B has terminated, the gate 50 is again closed, since diode 51 is back-biased by the negative 12-volt potential. During the storage interval from time $t_2$ to time $t_3$, the storage pulse D from multivibrator 58 is supplied to storage switch 70 which includes an N-P-N transistor 71 and resistor 72. When the positive-going storage pulse D is applied through resistor 72 to the base of transistor 71, the latter is saturated and the voltage at point 44 is transferred through storage switch 70 to a storage device 75. The storage device may, for example, consist of a storage capacitor 77 in the collector circuit of transistor 71. Capacitor 77 can be charged to the value of the voltage at point 44 in a relatively short storage interval $t_2$ to $t_3$ and the capacitor is made fairly large to prevent loss of charge through leakage during the interval preceding the next storage pulse. The storage switch 70 is opened at the termination of the storage pulse D (at time $t_3$). The stored voltage (waveform G—FIG. 2) across capacitor 77 is coupled to sample gate 60, specifically, to the emitter of the N-P-N transistor 62. Initially, it will be assumed that the voltage at point 45, which is made available at the base of transistor 62 of sample gate 60, will be substantially equal to the voltage at point 44, which is stored in capacitor 77 and made available at the emitter of transistor 62. The sample gate 60 is arranged to conduct only when the base of transistor 62 is more positive than the emitter. That is to say, conduction in transistor 62 occurs only during the sampling period and then only when the sampling voltage at point 55 is more positive than the stored voltage on capacitor 77. During the first sampling period $t_1$ to $t_2$ when the first sampling pulse 2B occurs, the voltages at the base and emitter of transistor 62 are identical. In the example shown in FIG. 2, the sampling pulse during the sampling period rises from the quiescent level of substantially minus 12 volts to minus 2 volts (see waveform F of FIG. 2) while the stored voltage E is also minus 2 volts. Consequently, transistor 62 will not conduct; that is to say, sample gate 60 is closed. Since there is no current flow in collector load resistor 65 during the sampling period $t_1$ to $t_2$, there is no voltage pulse at output terminal 66. In the circuit of FIG. 1, relay 85 is deenergized during the absence of negative-going output pulses at terminal 66 and relay contacts 87 are closed. The clock pulse A from generator 20, which has been suitably amplified without polarity inversion in relay drive current amplifier 80, passes through closed contacts 87 and serves to energize and cock the stepping switch 18. When the trailing edge of the amplified clock pulse arrives, at time $t_4$, the stepping relay is deenergized and the switch 18 is stepped to the next position. The stepping switch 18 remains in this position until once again successively energized and deenergized in response to the leading and trailing edges, respectively, of the next clock pulse from generator 20. Because of the stepping action at time $t_4$, the equalizer 16 is operated upon so that its electrical properties change. This affects the output of the transmission line, the light output from the oscilloscope 22, and the resistance of the photoelectric cell 24, in that order. It is now obvious that the input voltage to the detector has either increased or decreased to some new value. If the equalizer has been operated upon in the proper direction, the detector input voltage at input terminals 12 will have decreased to a more negative level. The next sampling pulse 2B will open special gate 50 during the period $t'_1$ to $t'_2$ and will permit a sampled voltage proportional to the new value of input voltage to be transferred from point 45 to point 55 and then to the base of sample gate transistor 62. If it be assumed that the new input voltage level has stepped from a previous level of minus 2 volts to a new level of minus 3 volts, the voltage at the base of transistor 62 will now be minus 3 volts during this sampling period $t'_1$ to $t'_2$. During the sampling period, however, the storage switch 70 is open and the new voltage level at point 44 cannot be transferred to storage capacitor 77. Consequently, the voltage across storage capacitor 77 is still at the previous level of minus 2 volts, and the voltage at the emitter of transistor 62 is minus 2 volts. Transistor 62, therefore, is cutoff and there still is no output available at output terminal 66. The next storage pulse D occurring during the interval $t'_2$ to $t'_3$ closes storage switch 70, thus permitting the new level of minus 3 volts to be stored in capacitor 77. By this time, however, the base of transistor 62 has returned to its quiescent value of about minus 12 volts, so that sample gate 60 remains closed. Upon arrival at time $t'_4$, of the trailing edge of the second amplified clock pulse, the stepping switch 18 again is made to step to the next position. This adjusts the equalization of transmission line 15 to the new value and the detector input voltage again changes. If it be assumed that the next level of input voltage is such that the sample voltage at points 44 and 45 is minus 4 volts, then minus 4 volts will appear at the base of transistor 62 and minus 3 volts at the emitter of transistor 62 during the next sampling period. Transistor 62 is still nonconducting and no output pulse appears at output terminal 66. The next stepping operation may step the input voltage to a level such that the sample voltage at points 44 and 45 is, say, minus 5 volts. The stored voltage is still minus 4 volts during the sampling operation and the stepping switch continues to the next position. The succeeding storage pulse permits storage capacitor 77 to charge to a value of minus 5 volts. If the direction of stepping now changes so that the voltage at points 44 and 45 rises to a value of, say, minus 4 volts, the voltage at the base of transistor 62, during the sampling period which follows, reaches minus 4 volts; simultaneously, the voltage G stored in capacitor 77 is minus 5 volts. The transistor 62 is now forward biased and, owing to current flow in collector resistor 65, a negative output pulse (waveform H—FIG. 2) appears at the output terminal 66 during the sampling period just described. This output pulse H is amplified in pulse amplifier 90 and supplied to a monostable multivibrator 92 which produces a negative pulse, the trailing edge of which is delayed so as to remain until shortly after the trailing edge of the corresponding clock pulse. The negative pulse from multivibrator 92 biases transistor 94 into conduction and energizes winding 88 of relay 85, thereby opening relay contacts 87 and preventing the clock pulse from advancing stepping switch 18 upon termination of said clock pulse. The aforementioned delay introduced by multivibrator 92 insures that the relay 85 will remain energized until termination of the clock pulse, thereby preventing accidental stepping of the stepping switch 18 during the occurrence of the trailing edge of the clock pulse.

When the storage pulse D following the output pulse at terminal 66 arrives, the stored voltage G at the storage capacitor 77 becomes equal to the voltage level at point 55 last attained by the device. Until the stepping sequence is once more actuated, the sampled voltage and the stored voltage remain equal, the storage gate transistor 62 thereafter is biased off, and no further output pulses occur at terminal 66. In this way, the output pulse 2H at detector output terminal 66 will detect the fact that the stepped input voltage has ceased to decrease and has started to increase in value. Although, in the device illustrated, the presence of a detector output pulse is manifested by cessation of stepping, it is apparent that the output pulse could be supplied to an indicator such as a peak voltmeter or oscilloscope to indicate that the change in slope has occurred.

In the system described in FIG. 1, the sampled and stored voltages necessarily will be at the same level at the time of initial energization of the system. If however, the detector is used in a system in which this initial equality does not exist, transistor 62 will be biased off, and there will be no output pulse at output terminal 66 so long as the voltage across storage device 75 is more positive than the sampled voltage. Once a positive-going step occurs, the sampled input voltage will become more positive than the stored input voltage and a negative-going output pulse will be derived at output terminal 66. The detector therefore may be used to indicate that the level of an input voltage has increased in a positive direction, as well as providing an indication that the direction of change of the input voltage from negative to positive has occurred. For example, in systems such as nuclear reactors, where the position of a nuclear reactor control rod is indicated in terms of a voltage, the detector according to the invention could be used to indicate that a change in position of the control rod from a mean position to a new position has occurred. In such an application, the sampling period must be less than the minimum period of change of the input voltage to the detector to provide necessary resolution.

The detector 10 of the invention may be arranged to provide an indication of the fact that a stepped voltage has started to change in a negative direction, instead of in a positive direction, as previously described in detail. This portion of the detector may include a separate gate 150 which includes a diode 151 and a resistor 152, and a sample gate 160 which includes transistor 162, resistor 163 and a collector load resistor 165 connected to the negative supply voltage. The diode 151 and resistor 152 of gate 150 serve the same function, respectively, as diode 51 and resistor 52 of gate 50, while the resistors 163 and 165 of sample gate 160 correspond in function to the respective resistors 63 and 65 of sample gate 60. The diode 151 of gate 150 is polarized oppositely to diode 51 of gate 50 inasmuch as the sampling pulse C derived at output line 57 of multivibrator 54 is of opposite polarity to that of the sampling pulse B applied to gate 50. A separate gate 150 is used rather than supplying the voltage at point 55 to sample gate 160 in order to avoid having the P–N–P transistor 162 of sample gate 160 normally biased on by the minus 12 volt quiescent level of the output at line 57 of multivibrator 54. If the transistor 162 were not normally biased off, the storage capacitor 77 would discharge through the path including transistor 162, resistor 165 and the power supply during the quiescent period between storage pulses D. A sampling pulse C is derived at the output line 57 of multivibrator 54 coincident with sampling pulse B at the output line 56 of multivibrator 54. This pulse C, when applied to gate 150, forward biases the diode 151 and allows the sampled voltage at point 45, after smoothing in integrator 47, to be coupled through resistor 152 of gate 150 and resistor 163 of sample gate 160 to the base of the P–N–P transistor 162. The stored voltage across storage capacitor 77 is applied to the emitter of transistor 162. From the previous explanation, it is apparent that, so long as the input voltage is stepping in the negative direction, the stored voltage applied to the emitter of transistor 162 of sample gate 160 will be more positive than the sampled voltage at point 155 which is supplied to the base of transistor 162. Current consequently will flow through load resistor 165 of transistor 162 during the corresponding sampling period. A positive output voltage pulse 2I thus will appear at the output terminal 166. So long as the input voltage is continuing to step negatively, an output pulse will appear at terminal 166. During the sampling period immediately following a positive-going input voltage step, using the example previously given, the stored voltage appearing at the emitter of transistor 162 will be minus 5 volts and the sampled voltage at the base of transistor 162 will be minus 4 volts. This voltage condition biases off transistor 162 and no output pulse appears at output terminal 166. The output from terminal 166 may be monitored by any indicating device, such as a cathode-ray oscilloscope.

From the foregoing description, it is now obvious that the occurrence of positive-going pulses at output terminal 166 will indicate that the output voltage has continued to decrease in stepwise fashion; simultaneously, there will be no negative output pulses at output terminal 66. If, on the other hand, a negative output pulse appears at output terminal 66 and no positive output pulse appears at output terminal 166, an indication is given that the input voltage has just increased. Whenever an output pulse appears at output terminal 66, there will be no output pulse at output terminal 166, and vice versa. Since the output pulses are of opposite polarity for the two conditions above mentioned, a single indicating device could be used and the polarity of the indicated output display would provide a means of recognizing in which direction the stepped voltage has stepped.

It should be noted that the polarity of the diodes in the gates 50 and 150 and the polarity of the transistors in the sample gates 60 and 160 will be reversed whenever the impedance matching network 28 causes an inversion in the input voltage at terminals 12. This follows since the voltage then existing at the input to the storage switch 70 and the gates 50 and 150 would be increasing stepwise rather than decreasing, as in the case of the actual input voltage.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A detector for detecting a change in magnitude of a stepwise varying input voltage comprising means for sampling said input voltage at recurring intervals, means for generating a storage pulse subsequent to each sampling interval, means for storing said input voltage in response to each of said storage pulses until the arrival of the next storage pulse, output comparison means operated upon by said sampled voltage and said stored voltage for providing an output signal to indicate the change in the magnitude of said imput voltage.

2. A detector for detecting a change in magnitude of a stepwise varying input voltage comprising means for sampling said input voltage at recurring intervals, means for generating a storage pulse subsequent to each sampling interval, means for storing said input voltage in response to each of said storage pulses until the arrival of the next storage pulse, output comparison means operated upon by said sampled voltage and said stored voltage for providing an output signal to indicate the change in the magnitude of said input voltage, each sampling pulse and the corresponding storage pulse occurring with the period of the stepwise variations in magnitude of said input voltage.

3. A detector for detecting a change in magnitude of a stepwise varying input voltage comprising means for sampling said input voltage at recurring intervals, means for generating a storage pulse subsequent to each sampling interval, means for storing said input voltage in response to each of said storage pulses until the arrival of the next storage pulse, gating means responsive to the difference between said sampled voltage and said stored voltage for providing an output signal to indicate the change in the magnitude of said input voltage in a predetermined direction.

4. A detector for detecting an amplitude change in a stepwise varying input voltage comprising means for generating a series of recurring sampling pulses, means for generating a storage pulse subsequent to each of said sampling pulses, output comparison means, means operated by said storage pulse for storing a first voltage, said first voltage having a magnitude which is proportional to the magnitude of said input voltage during the period of said storage pulse, means for applying said first voltage to said output comparison means, and means for applying a second voltage to said comparison means, said second voltage having a magnitude dependent upon the magnitude of said input voltage during the period of each sampling pulse, whereby said output comparison means produces an output pulse during the sampling pulse period immediately following an input voltage change in a predetermined direction.

5. A detector for detecting amplitude changes in a stepwise varying input voltage comprising input terminal means receptive of said input voltage, means for generating a series of recurring sampling pulses, means for generating a storage pulse subsequent to each of said sampling pulses, first and second output comparison means, means for storing a first voltage, the magnitude of said first voltage being proportional to that of said input voltage during the period of said storage pulse, means for applying said first voltage to each of said output comparison means, and means for applying to each of said comparison means a second voltage, the magnitude of said second voltage being dependent upon the magnitude of said input voltage to each of said comparison means during the period of each sampling pulse, said first output comparison means producing an output pulse during the sampling pulse period immediately following an increase in amplitude of said input voltage, said second output comparison means producing an output pulse during the sampling pulse period immediately following a decrease in amplitude of said input voltage.

6. A detector for detecting a change in magnitude of a stepwise varying input voltage comprising input means for receiving said input voltage, first gating means coupled to said input means, means for generating sampling pulses at recurring intervals and applying said sampling pulses to said first gating means, a comparison network, said first gating means being conditioned by said sampling pulses to transfer said input voltage to said comparison network, means for generating storage pulses each subsequent to a successive one of said sampling pulses, means including a second gating means energized by said input voltage and a given one of said storage pulses for storing the input voltage at the level existent at the time of said given storage pulse, means for supplying said stored voltage to said comparison network, said comparison network providing an output signal whenever the magnitude of said input voltage varies in a predetermined direction.

7. A detector for detecting a change in magnitude of a stepwise varying input voltage comprising input means for receiving said input voltage, first gating means coupled to said input means, means for generating sampling pulses at recurring intervals, a comparison network, said first gating means being conditioned by said sampling pulses to transfer said input voltage to said comparison network, means for generating storage pulses each subsequent to a successive one of said sampling pulses, means including a second gating means repetitively energized by said input voltage and said storage pulses for storing the input voltage at the levels existent at the times of occurrence of said storage pulses, means for supplying said stored voltage to said comparison network, said comparison network providing an output signal whenever the magnitude of said input voltage varies in a predetermined direction, each pair of said sampling pulses and storage pulses occurring within the period between the stepwise changes in magnitude of said input voltage.

8. A detector for detecting a change in magnitude of a stepwise varying input voltage comprising input means for receiving said input voltage, first gating means coupled to said input means, means for generating sampling pulses at recurring intervals, first and second comparison networks, said first gating means being conditioned by said sampling pulses to transfer said input voltage to each of said comparison networks, means for generating storage pulses each subsequent to a successive one of said sampling pulses, means including a second gating means energized by said input voltage and said storage pulses for storing the input voltage at the levels existent at the times of occurrence said given storage pulses, means for supplying said stored voltage to each of said comparison networks, said first comparison network providing an output signal during the sampling pulse period immediately following an increase in magnitude of said input voltage, and said second comparison network providing an output signal during the sampling pulse period immediately following a decrease in magnitude of said input voltage.

9. A detector for detecting a change in magnitude of a stepwise varying input voltage comprising input terminal means for receiving said input voltage and translating said voltages into first and second corresponding voltages, first gating means coupled to said input terminal means for receiving said first corresponding voltage, means for generating sampling pulses at recurring intervals, first and second comparison networks, said first gating means being conditioned by said sampling pulses to transfer said first corresponding voltage to each of said comparison networks, means for generating storage pulses each subsequent to successive one of said sampling pulses, means including a second gating means repetitively conditioned by said storage pulses for storing said second corresponding voltage at the level existent at the times of occurrence of said storage pulses, means for supplying said stored voltage to each of said comparison networks, said first comparison network providing an output signal during the sampling pulse period immediately following an increase in magnitude of said input voltage, and said second comparison network providing an output signal during the sampling pulse period immediately following a decrease in magnitude of said input voltage, each sampling pulses and the corresponding storage pulse occurring within the period between changes in magnitude of said input voltage.

References Cited by the Examiner

UNITED STATES PATENTS 3,054,960   9/62   Pearlman _____ 328—148
3,105,158   9/63   Nichols _____ 307—88.5

ARTHUR GAUSS, *Primary Examiner.*